US008077997B2

(12) United States Patent
Liao et al.

(10) Patent No.: US 8,077,997 B2
(45) Date of Patent: Dec. 13, 2011

(54) METHOD AND APPARATUS FOR IMAGE PROCESSING

(75) Inventors: Ming-Hao Liao, Taipei County (TW); Jen-Shi Wu, Jhubei (TW); Chung-Yi Chen, Nantou County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 861 days.

(21) Appl. No.: 12/155,452

(22) Filed: Jun. 4, 2008

(65) Prior Publication Data
US 2008/0310749 A1    Dec. 18, 2008

(30) Foreign Application Priority Data
Jun. 15, 2007    (TW) ................ 96121675 A

(51) Int. Cl.
*G06K 9/40*    (2006.01)
(52) U.S. Cl. ........ 382/260; 348/609; 348/630; 348/641; 348/663; 348/664; 348/665; 348/666; 348/669; 348/670; 358/2.1; 358/532; 367/90; 382/176; 382/250
(58) Field of Classification Search .................. None
See application file for complete search history.

(56) References Cited

U.S. PATENT DOCUMENTS

| 4,641,180 | A | * | 2/1987 | Richter | 348/669 |
|---|---|---|---|---|---|
| 4,864,389 | A | * | 9/1989 | Faroudja et al. | 348/670 |
| 5,150,433 | A | * | 9/1992 | Daly | 382/250 |
| 5,206,715 | A | * | 4/1993 | Jung et al. | 348/664 |
| 5,331,442 | A | * | 7/1994 | Sorimachi | 358/532 |
| 5,883,973 | A | * | 3/1999 | Pascovici et al. | 382/176 |
| 6,175,389 | B1 | * | 1/2001 | Felts et al. | 348/663 |
| 6,268,935 | B1 | * | 7/2001 | Kingetsu et al. | 358/2.1 |
| 6,614,719 | B1 | * | 9/2003 | Grzesek | 367/90 |
| 7,167,213 | B1 | * | 1/2007 | Murdock et al. | 348/666 |
| 7,227,585 | B1 | * | 6/2007 | Murdock et al. | 348/641 |
| 7,324,163 | B2 | * | 1/2008 | Bacche | 348/663 |
| 7,474,357 | B1 | * | 1/2009 | Murdock et al. | 348/665 |
| 7,532,254 | B1 | * | 5/2009 | Woodall | 348/609 |
| 7,742,110 | B1 | * | 6/2010 | Woodall | 348/665 |
| 2002/0051088 | A1 | * | 5/2002 | Ikeda et al. | 348/630 |
| 2004/0085592 | A1 | * | 5/2004 | Feng et al. | 358/3.27 |

* cited by examiner

*Primary Examiner* — Anand Bhatnagar
*Assistant Examiner* — Tsung-Yin Tsai
(74) *Attorney, Agent, or Firm* — Rabin & Berdo, P.C.

(57) ABSTRACT

An image processing method and an image processing apparatus are provided. After receiving an image signal, the image and apparatus according to the invention first judge whether a target block in the image signal includes a non-chroma line. If the judging result is YES, a first edge detection procedure will be performed on the non-chroma line. If the judging result is NO, a second edge detection procedure will be performed on the target block.

7 Claims, 14 Drawing Sheets

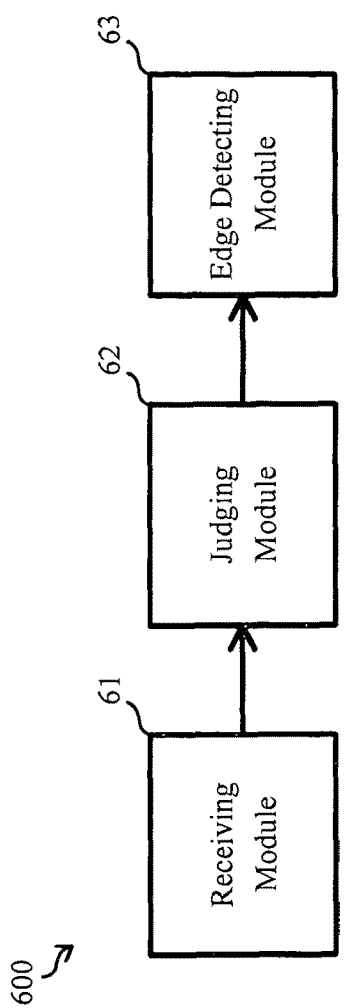
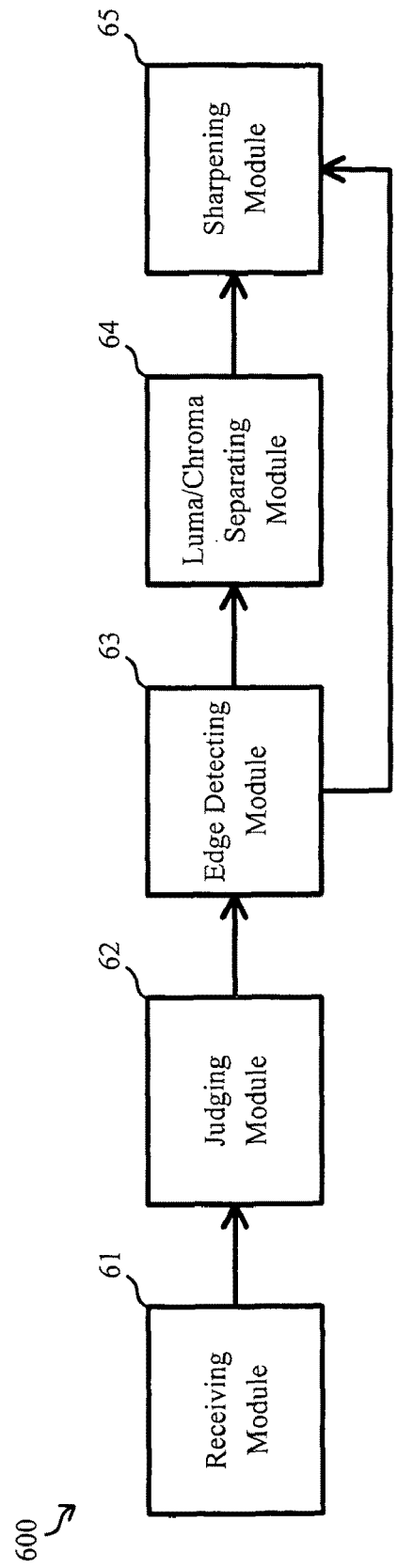
FIG. 7(A)
FIG. 7(B)

METHOD AND APPARATUS FOR IMAGE PROCESSING

BACKGROUND OF THE INVENTION

1. Field of the Invention

The present invention relates to image processing techniques and, in particular, to methods and apparatuses for detecting luma/chroma edges of images.

2. Description of the Prior Art

The composite video baseband signal (CVBS) is a currently widely used analog video signal, and it is composed of luma signals and chroma signals of images.

Please refer to FIG. 1(A), which illustrates an example of the CVBS waveform. Region 10 includes plural synchronizing pulses for indicating the start of each horizontal scan line. Region 12 includes sinusoidal signals (generally called the color burst) that provide reference voltages for chroma signals. Region 14 is the portion that includes image data of the CVBS. The voltage of the stair-like luma signal in region 14 corresponds to the brightness of images. For instance, $V_{MAX}$ in FIG. 1(A) may correspond to the brightness of a gray level equal to 255, and $V_{MIN}$ may correspond to the brightness of a gray level equal to 0.

In the CVBS specification, the chroma signal is represented by sinusoidal waves (not shown in the figure) added on the luma signal in region 14. The chroma signal is generated by modulating a carrier signal that has the same frequency as the color burst. By monitoring the phase difference between the chroma signal in region 14 and the color burst in region 12, the receiving end can determine the hue of the chroma signal. As shown in FIG. 1(B), in the frequency domain, the luma signal of the CVBS is distributed in the region of lower frequency, and the chroma signal is distributed in the region of higher frequency.

After receiving the CVBS, most image processing system first separate the luma and chroma signals therein by a luma/chroma separating procedure (also called Y/C separating procedure). In the simplest luma/chroma separating procedure, luma signals are generated by filtering the CVBS with a low-pass filter. On the contrary, chroma signals are generated by filtering the CVBS with a high-pass filter.

However, when a rapid change occurs in the colors and/or brightness of an image, a rapid change in the corresponding luma/chroma signals will also introduce high-frequency components. In other words, the output of the high-pass filter might not be purely chroma signals. More specifically, some non-chroma components may be misjudged as chroma components. This condition generally happens at intersections of different colors and/or brightness in an image.

To prevent the aforementioned misjudging problem, luma/chroma edge regions must be avoided when the CVBS is filtered in the luma/chroma separating procedure. Therefore, before the luma/chroma separating procedure, the receiving end usually must first perform an edge detecting procedure in advance, so as to avoid or neglect edge regions.

Besides the luma/chroma separating procedure, some image processing systems also perform a sharpening procedure on the CVBS. The sharpening procedure needs information about edge positions as well.

Please refer to FIG. 2, which illustrates the block diagram of a conventional CVBS receiving system. The receiving system 20 includes a sampling module 21, a buffer 22, an edge detecting module 23, a luma/chroma separating module 24, and a sharpening module 25.

The sampling module 21 first samples the CVBS transmitted to the receiving system 20 and temporarily stores the sampling results into the buffer 22. The data stored in the buffer 22 may correspond to a complete image or only a block in an image. The edge detecting module 23 first judges whether any edge exists in the image/block stored in the buffer 22 and then provides its judgment to the luma/chroma separating module 24 and the sharpening module 25.

Please refer to FIG. 3(A), which illustrates an example of a CVBS and several sample points (32A~32E). In this example, the frequency of the sampling signal is four times of the frequency of the color burst. The label T in this figure represents the period of the color burst. Theoretically, if there is no rapid change in colors and/or brightness of the image, the voltages of the two sample points with a time difference of T should be approximately the same. In other words, the voltages of the sample points 32A and 32E should be about equivalent.

Please refer to FIG. 3(B), which illustrates an example of another CVBS and several sample points (34A~34E). In this example, the brightness of the CVBS changes between the sample points 34C and 34D. Thus, the voltage difference of the sample points 34A and 34E is larger. Through comparing the voltages of the sample points 34A and 34E, the edge detecting module 23 can identify that an edge of colors and/or brightness exists between the sample points 34A and 34E.

In prior arts, limited by the characteristic of sinusoidal signals, the sample time of two sample points to be compared must be separated by time T or a multiple of T. In other words, the highest "resolution" of conventional edge detecting procedures is larger than or equal to the period of the chroma signal. Accordingly, under the condition shown in FIG. 3(B), the receiving end can only identify that at least one edge exists between the sample points 34A and 34E but cannot judge the exact position of the edge.

When the colors and/or brightness of an image rapidly changes, and the changing period is smaller than that of the color burst, conventional edge detecting procedures may even be unable to detect the existence of the edges. If an edge detecting procedure is unable to find out edges correctly, the image quality provided by the receiving end may be significantly decreased.

SUMMARY OF THE INVENTION

To solve the aforementioned problems, the invention provides image processing methods and image processing apparatuses. Because the characteristics of luma and chroma lines in CVBS are different, the methods and apparatuses according to the invention perform different edge detecting procedures on the two kinds of lines. Thereby, compared with prior arts, the methods and apparatuses according to the invention can reduce the possibility of missing edges of colors and/or brightness.

The first embodiment according to the invention is an image processing method. In this method, after receiving an image signal, it is first judged whether a target block in the image signal comprises a non-chroma line. If the judging result is YES, a first edge detecting procedure is performed on the non-chroma line, and a second edge detecting procedure on the target block except the non-chroma line is selectively performed. On the contrary, if the judging result is NO, the second edge detecting procedure is performed on the target block.

The second embodiment according to the invention is another image processing method. In this method, after receiving an image signal, a judging procedure is first performed to judge whether a target block in the image signal comprises a non-chroma line. A weighting value is then generated based on the judging result of the judging procedure. Subsequently, a first edge detecting procedure and a second edge detecting procedure are respectively performed on the target block. The result of the first edge detecting procedure is a first voltage difference. The result of the second edge detecting procedure is a second voltage difference. Based on the weighting value, the first voltage difference, and the second voltage difference, a weighted voltage difference is calculated. If the weighted voltage difference is larger than a threshold value, a detecting result that indicates an existing edge in the target block is generated.

The third embodiment according to the invention is another image processing apparatus. The apparatus includes a receiving module, a judging module, a first edge detecting module, a second edge detecting module, a calculating module, and a comparing module. The receiving module is used for receiving an image signal. The judging module is used for performing a judging procedure to judge whether a target block in the image signal comprises a non-chroma line and to generate a weighting value based on the judging result of the judging procedure. The first edge detecting module performs a first edge detecting procedure on the target block to generate a first voltage difference. The second edge detecting module performs a second edge detecting procedure on the target block to generate a second voltage difference. Based on the weighting value, the first voltage difference, and the second voltage difference, the calculating module calculates a weighted voltage difference. The comparing module is used for comparing the weighted voltage difference with a threshold value. If the weighted voltage difference is larger than the threshold value, the comparing module generates a detecting result that indicates an existing edge in the target block.

The advantage and spirit of the invention may be understood by the following recitations together with the appended drawings.

BRIEF DESCRIPTION OF THE APPENDED DRAWINGS

FIG. 1(A) and FIG. 1(B) respectively illustrate the waveform example and the spectrum of the CVBS.

FIG. 2 illustrates the block diagram of a conventional CVBS receiving system.

FIG. 3(A) and FIG. 3(B) illustrate examples of the CVBS and its sample points.

Figure 6A:
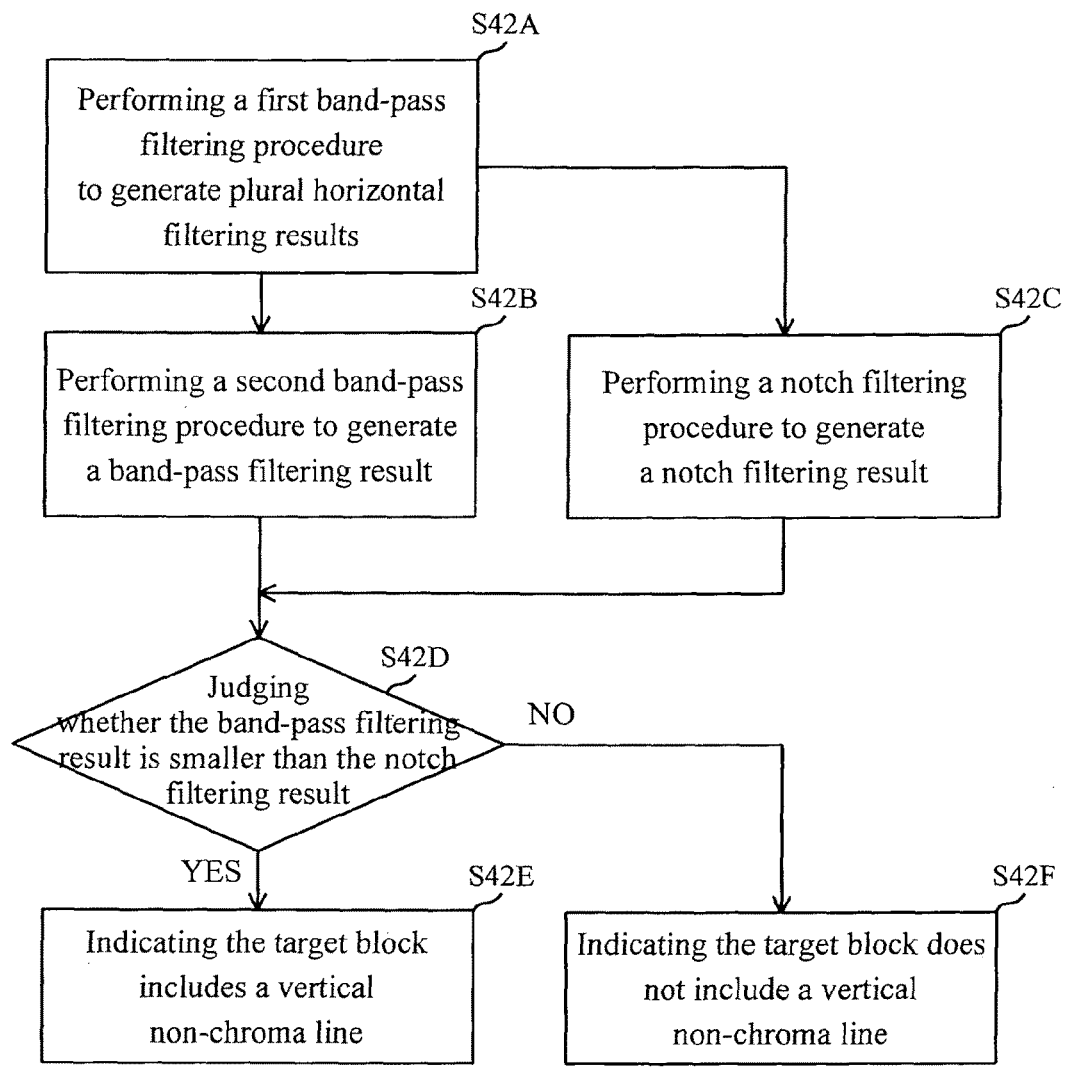
Figure 6B:
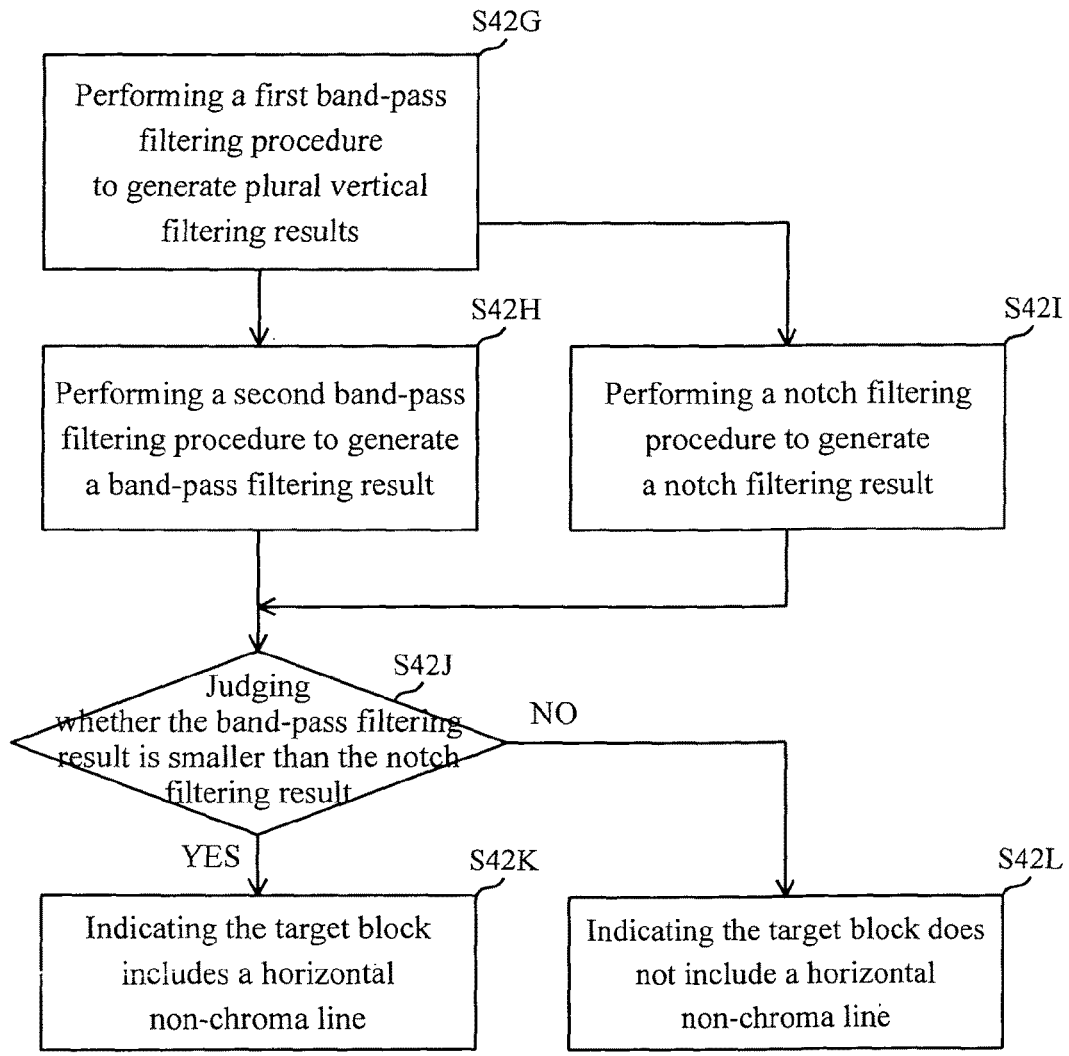

FIG. 6(A) and FIG. 6(B) are detailed flowcharts of how to detect vertical/horizontal non-chroma lines in step S42.

FIG. 7(A) illustrates the block diagram of the image processing apparatus in the second embodiment according to the invention FIG. 7(B) illustrates the block diagram of the image processing apparatus that further includes a luma/chroma separating module and a sharpening module.

Figure 7C:
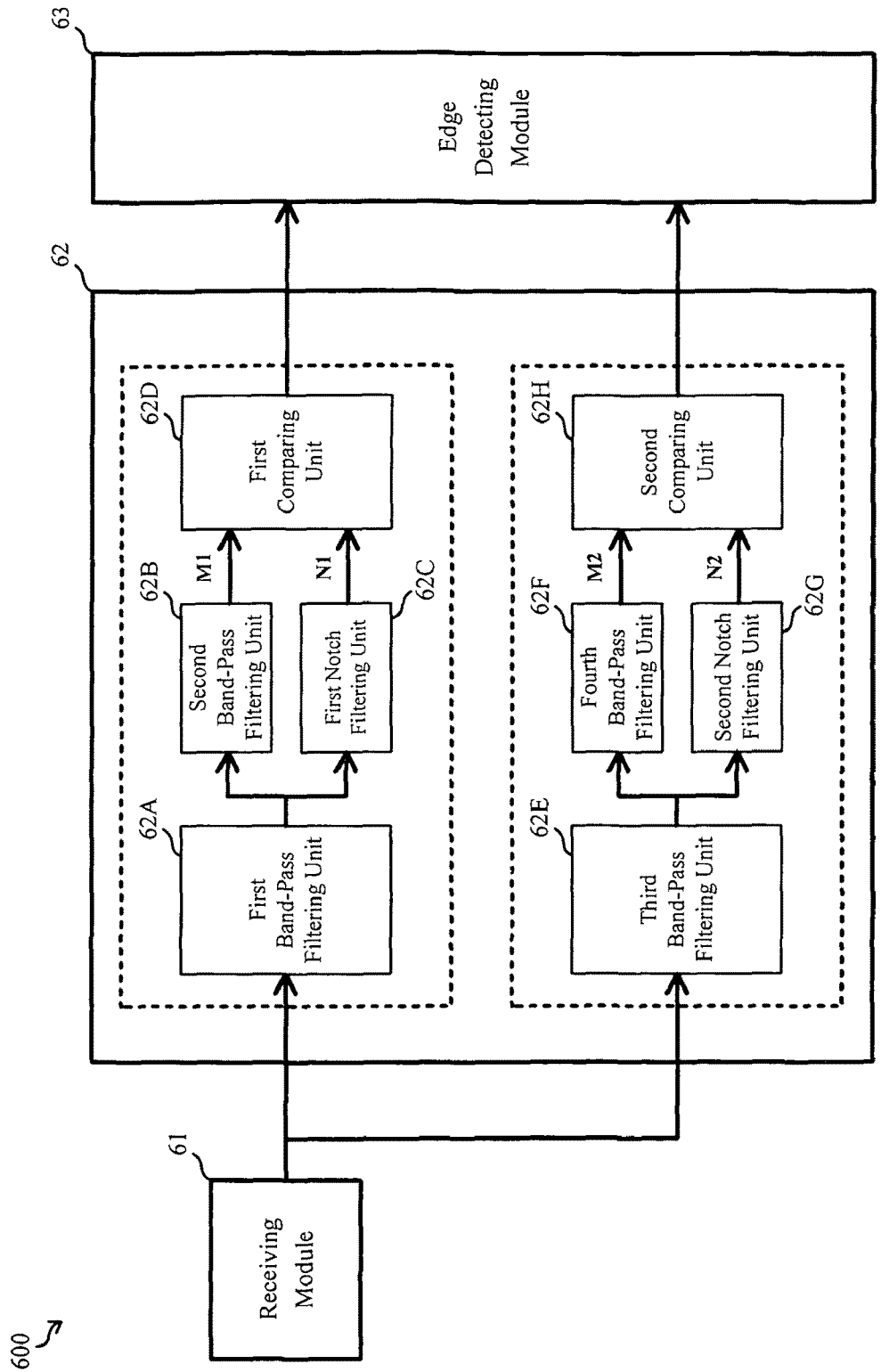

FIG. 7(C) illustrates the detailed block diagram of the judging module.

Figure 8:
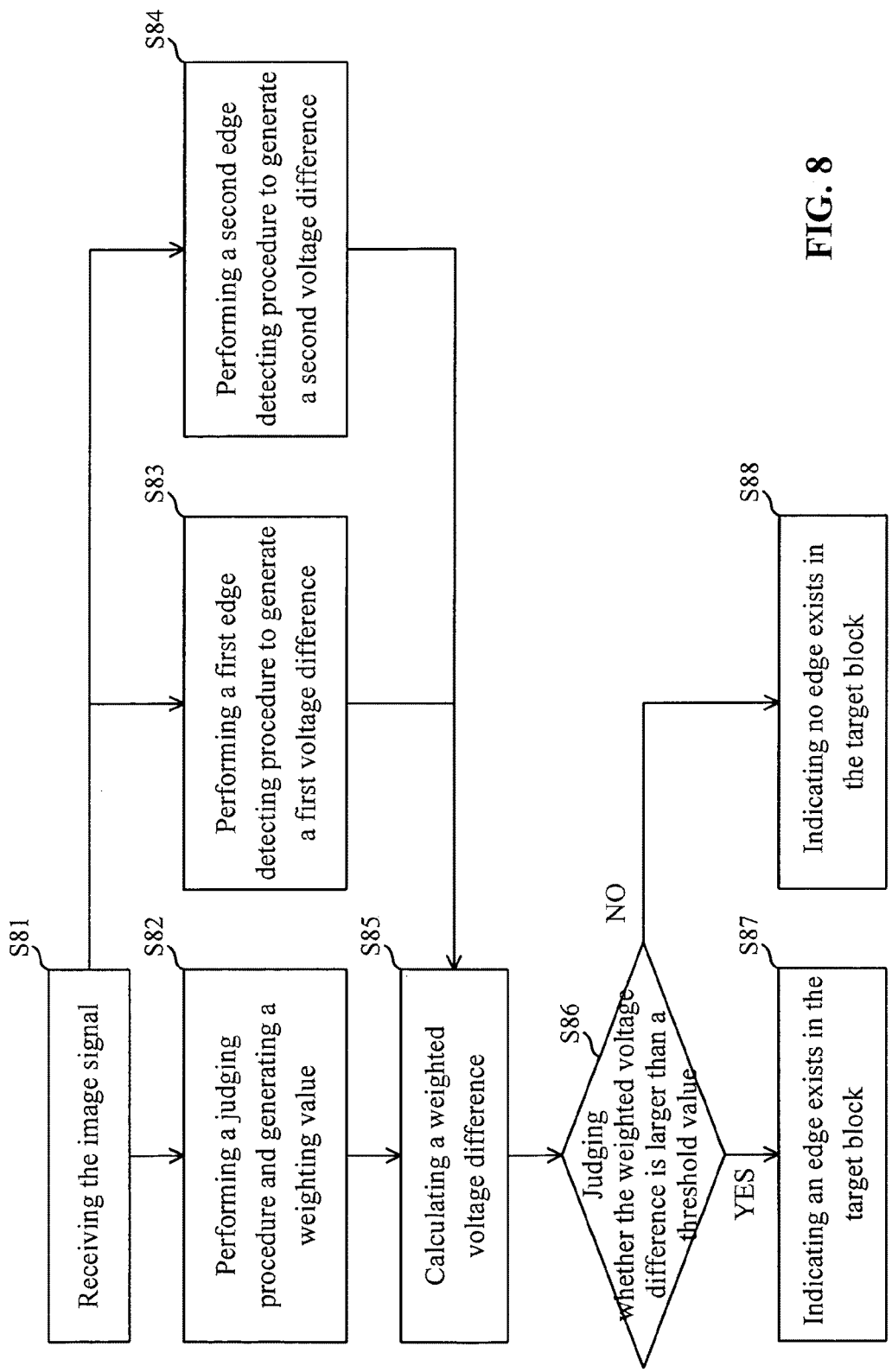

FIG. 8 illustrates the flowchart of the image processing method in the third embodiment according to the invention.

Figure 9:
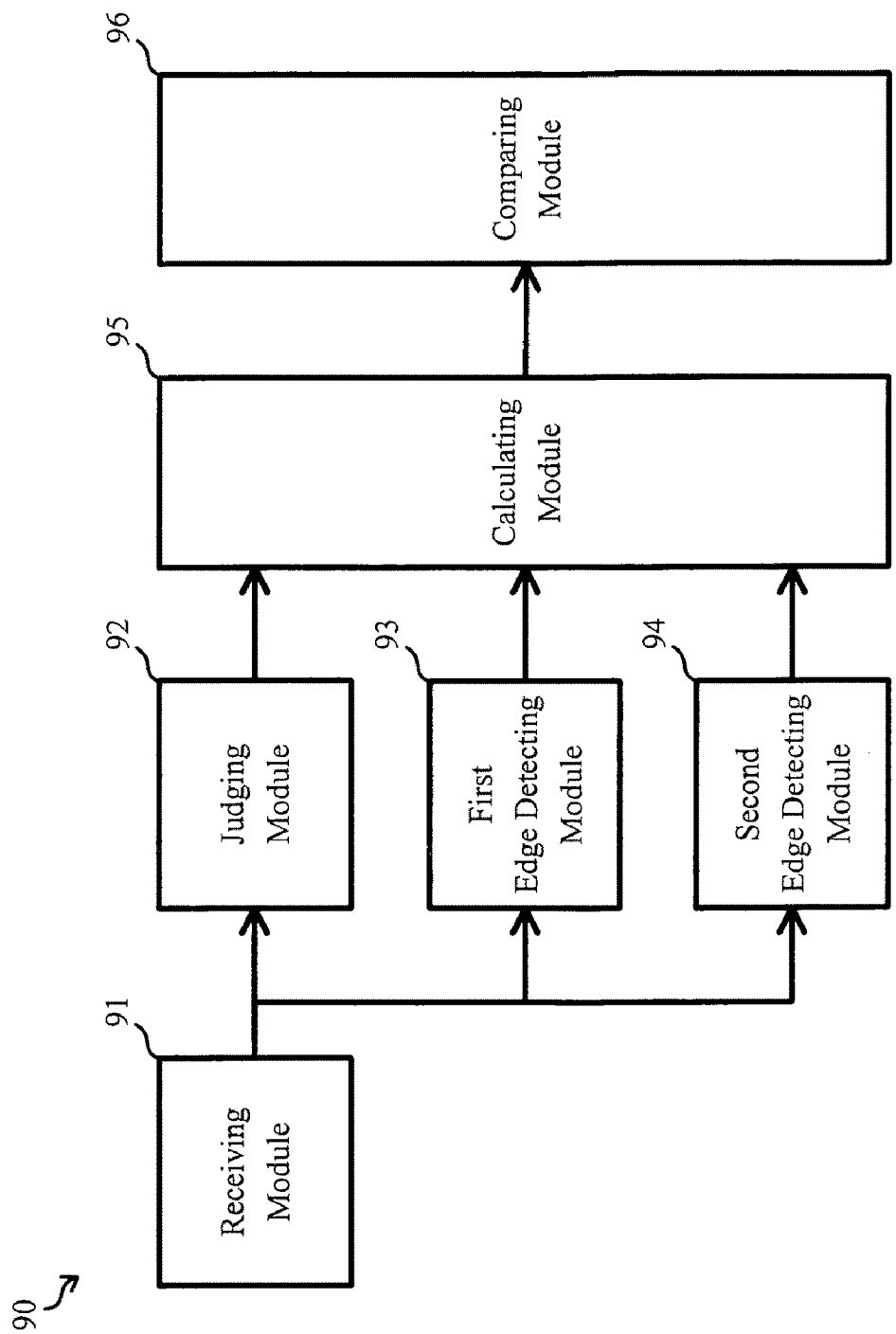

FIG. 9 illustrates the block diagram of the image processing apparatus in the fourth embodiment according to the invention

DETAILED DESCRIPTION OF THE INVENTION

The first embodiment according to the invention is an image processing method. Please refer to FIG. 4(A), which illustrates the flowchart of this method. In step S41, an image signal is received. Then, in step S42, it is judged whether a target block in the image signal comprises a non-chroma line. If the judging result of step S42 is YES, a first edge detecting procedure is performed on the non-chroma line in step S43. If the judging result of step S42 is NO, a second edge detecting procedure is performed on the target block in step S44. In actual applications, the second edge detecting procedure can also be performed on the target block except the non-chroma line in step S43.

Figure 1A:
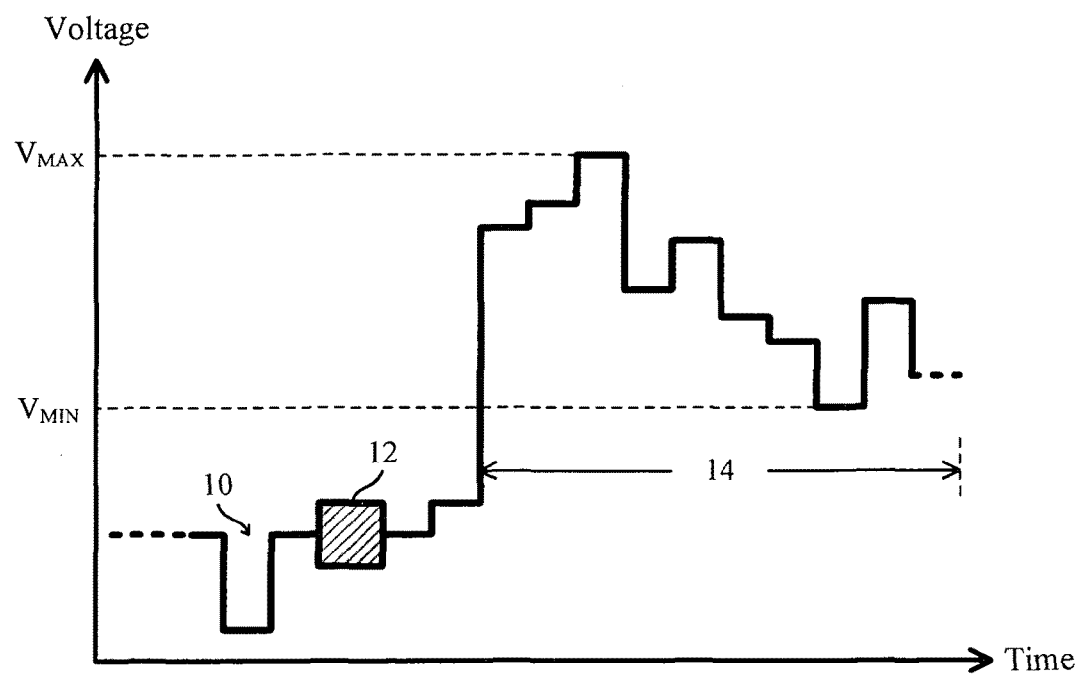

As described above, in the CVBS specification, the chroma signal is represented by sinusoidal waves added on the luma signal. When a non-chroma line is included in an image, the CVBS waveform of the non-chroma line is similar to the stair-like signal shown in FIG. 1(A). In other words, the waveform corresponding to the non-chroma line does not include sinusoidal components for representing chroma. By utilizing this characteristic, the methods and apparatuses according to the invention can perform an edge detecting procedure with higher "resolution" on non-chroma lines, so as to increase the possibility of successful edge detections.

Figure 4A:
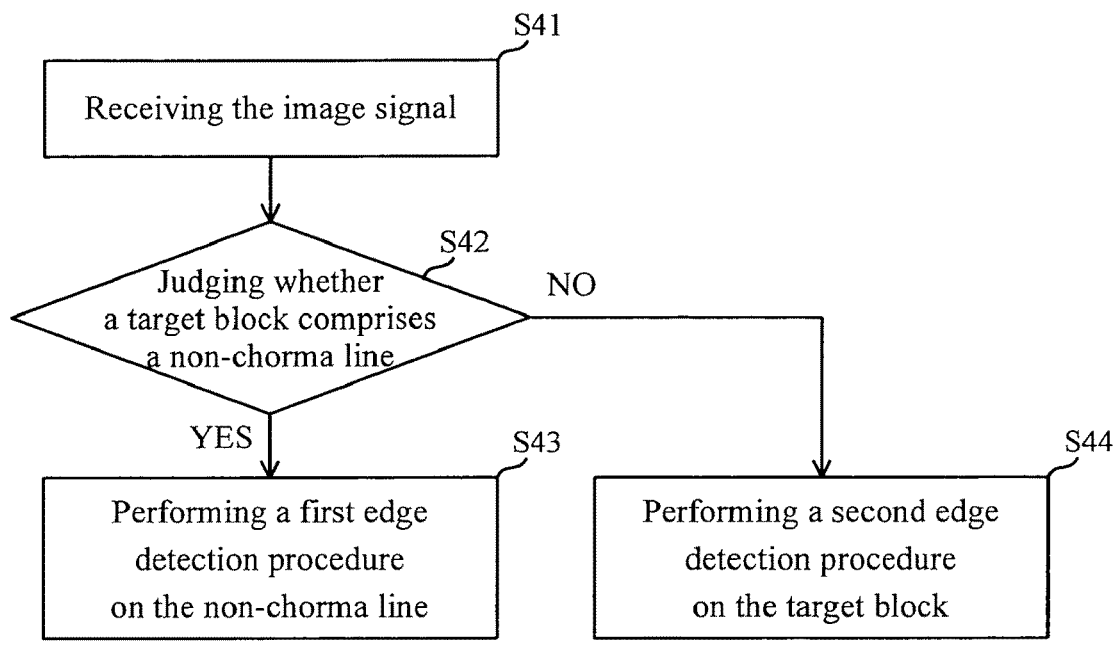
FIG. 4(A) illustrates the flowchart of the image processing method in the first embodiment according to the invention.

As shown in FIG. 4(A), different edge detecting procedures are performed on non-chroma and chroma lines. More specifically, the first edge detecting procedure performed on the non-chroma line can have higher "resolution" than that of the second edge detecting procedure.

Figure 5A:
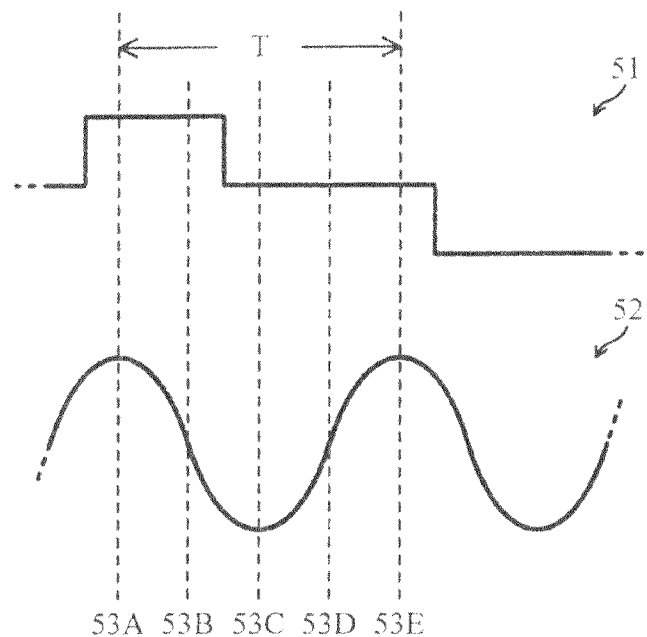
FIG. 5(A) illustrates examples of the CVBS of a non-chroma line, the CVBS of a chroma line, and plural sample points.

Please refer to FIG. 5(A), which illustrates examples of the CVBS of a non-chroma line, the CVBS of a chroma line, and plural sample points (53A~53E). As shown in FIG. 5(A), the CVBS of the non-chroma line 51 does not include sinusoidal voltages. Therefore, without the limitation due to the characteristics of sinusoidal signals, the voltages of two adjacent sample points can be directly compared in the first edge detecting procedure.

For instance, in the first edge detecting procedure, the voltage difference between the sample points 53A and 53B can be first calculated. Subsequently, the voltage difference is compared with a threshold value. If the voltage difference is larger than the threshold value, a detecting result that indicates an edge (i.e. change of brightness) exists in the non-chroma line 51 is generated. In the example shown in FIG. 5(A), there is a brightness edge between the sample points 53B and 53C. By comparing the voltages of the sample points 53B and 53C, the first edge detecting procedure can detect this brightness edge.

In this example, the frequency of the sampling signal is four times of the frequency of the chroma signal. The label "T" in FIG. 5(A) represents the period of sinusoidal signal of the chroma line 52. As described above, in the first edge detecting procedure, the sampling time difference between two sample points to be compared can be smaller than T. On the contrary, in the second edge detecting procedure, the sampling time difference between two sample points to be compared (e.g. 53A and 53E) can be substantially equal to T.

Figure 4B:
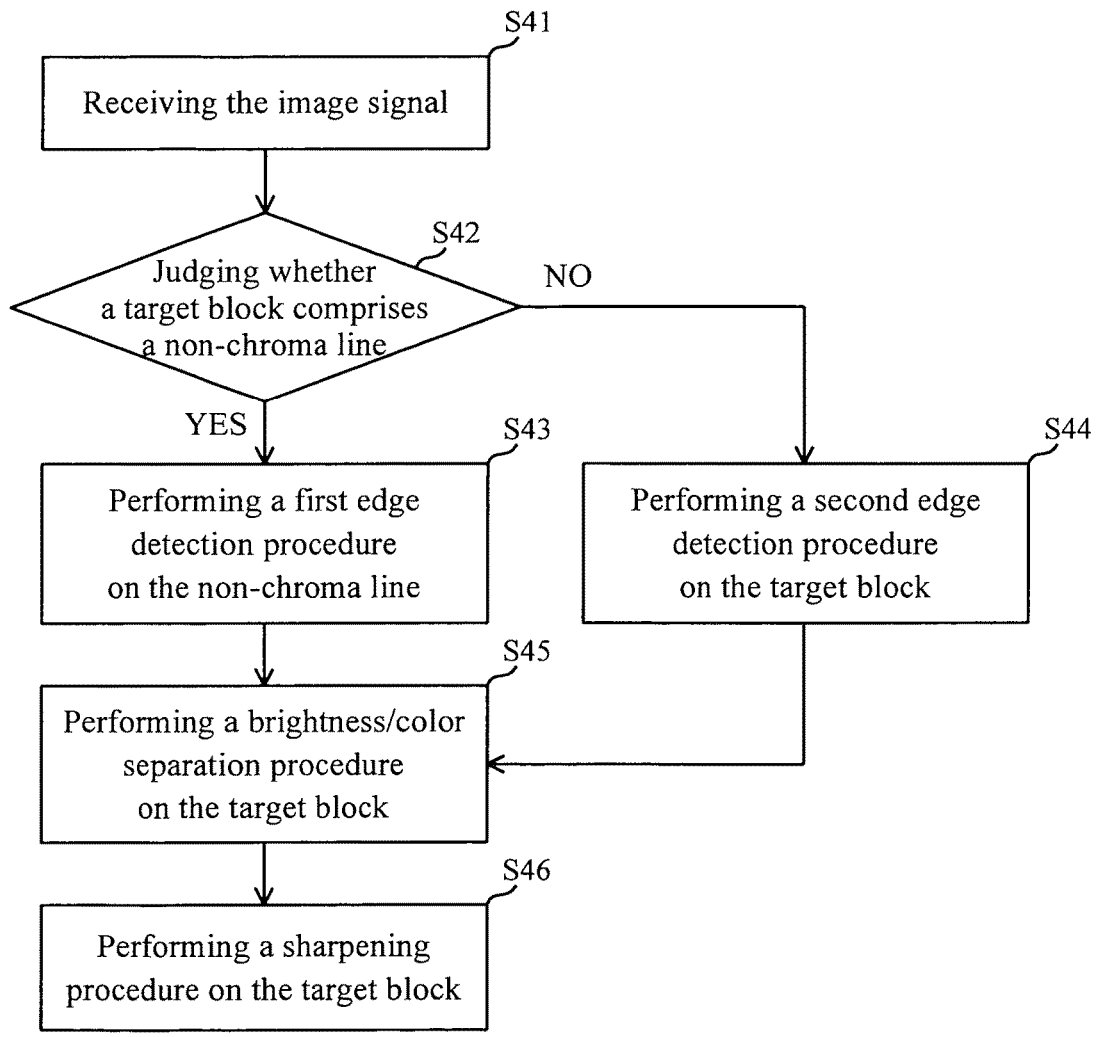
FIG. 4(B) illustrates the flowchart of the image processing method that further includes a luma/chroma separating procedure and a sharpening procedure.

Please refer to FIG. 4(B), which illustrates the flowchart of the image processing method that further includes a luma/chroma separating procedure and a sharpening procedure. In step S45, a luma/chroma separating procedure is performed on the target block based on a detecting result of the first edge detecting procedure or the second edge detecting procedure. In step S46, a sharpening procedure is performed on the target block based on a detecting result of the first edge detecting procedure or the second edge detecting procedure.

Figure 1B:
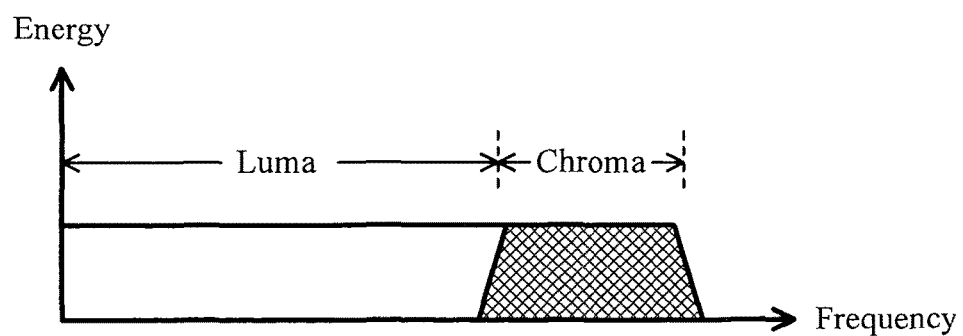
Figure 2:
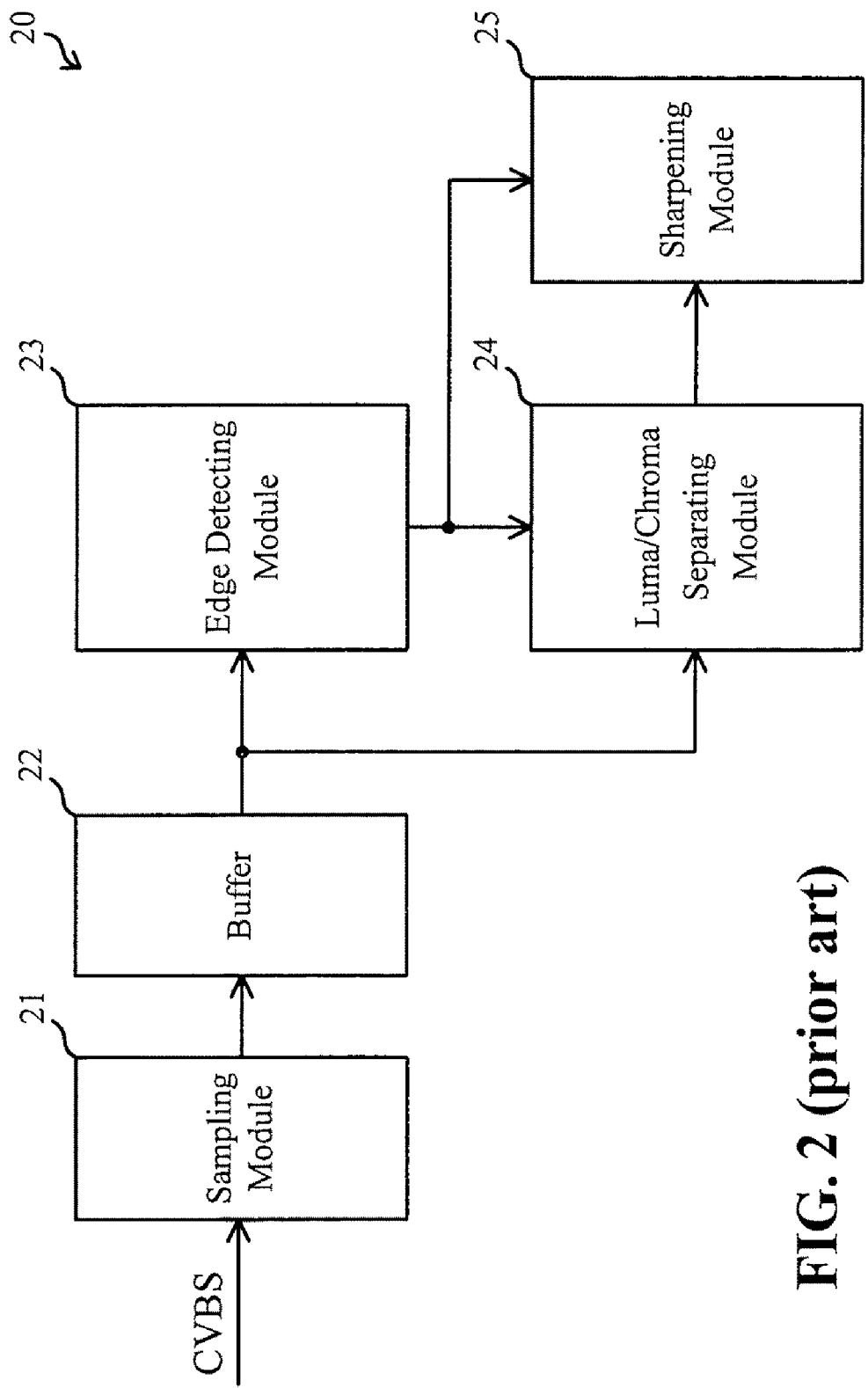
Figure 3A:
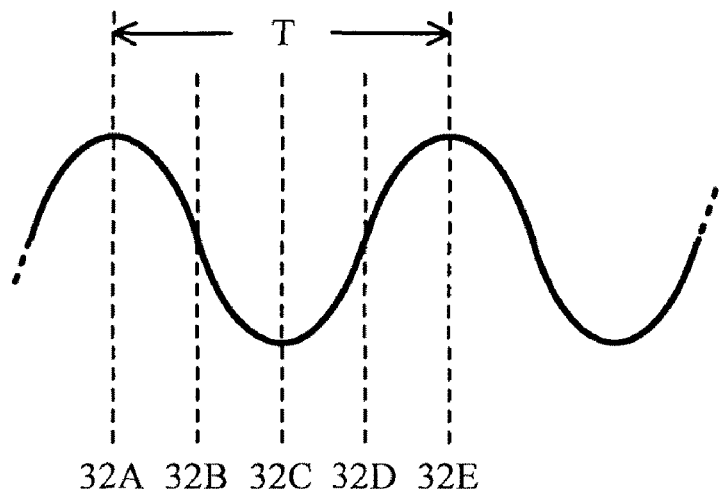
Figure 3B:
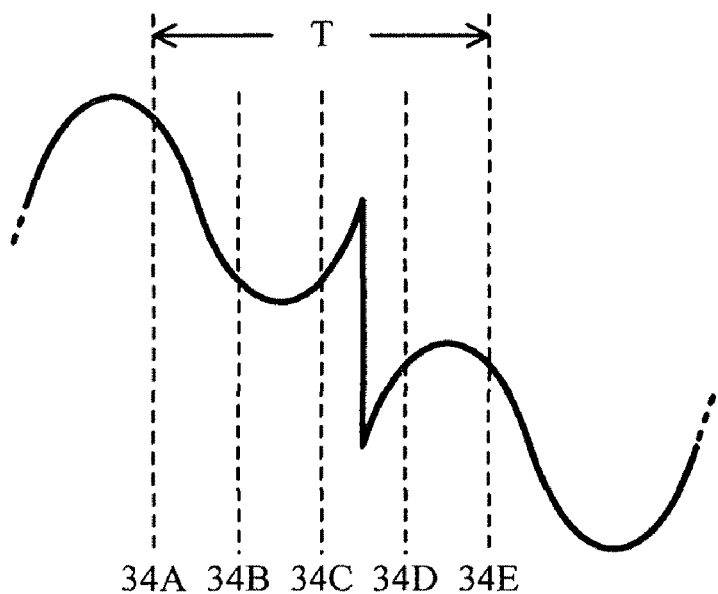

In practical applications, step 42 can judge whether the target block includes a vertical non-chroma line with the steps shown in FIG. 6(A). First, in the sub-step S42A, a first band-pass filtering procedure is performed on plural horizontal lines in the target block, and plural horizontal filtering results are accordingly generated. The passable frequency band in the first band-pass filtering procedure can substantially cover the frequency band of the chroma signal shown in FIG. 1(B).

Figure 5B:
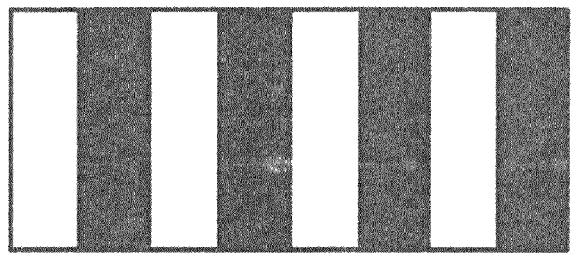
FIG. 5(B) shows an example of vertical and interlaced bright/dark lines.
Figure 5C:
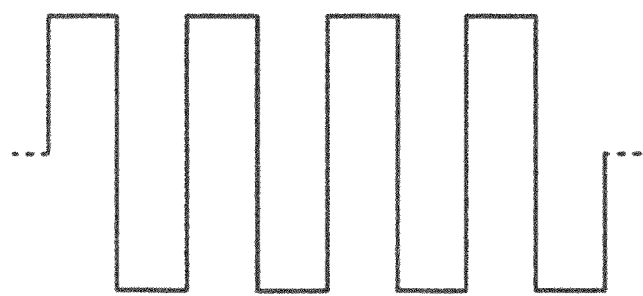
FIG. 5(C) illustrates a possible CVBS waveform corresponding to a certain horizontal line in FIG. 5(B).

Generally, compared with chroma signals, luma signals have lower changing frequency. Therefore, the existence of high frequency components in the horizontal direction usually means that chroma signals are present in a horizontal line. However, if a portion composed of vertical and interlaced bright/dark lines (i.e. plural vertical non-chroma lines) as shown in FIG. 5(B) exists in an image, there are also high frequency components in the horizontal direction. FIG. 5(C) illustrates a possible CVBS waveform corresponding to a certain horizontal line in FIG. 5(B). To prevent misjudging vertical and interlaced bright/dark lines as horizontal chroma lines, in methods according to the invention, the plural horizontal filtering results generated in step S42A can be further analyzed.

Figure 5D:
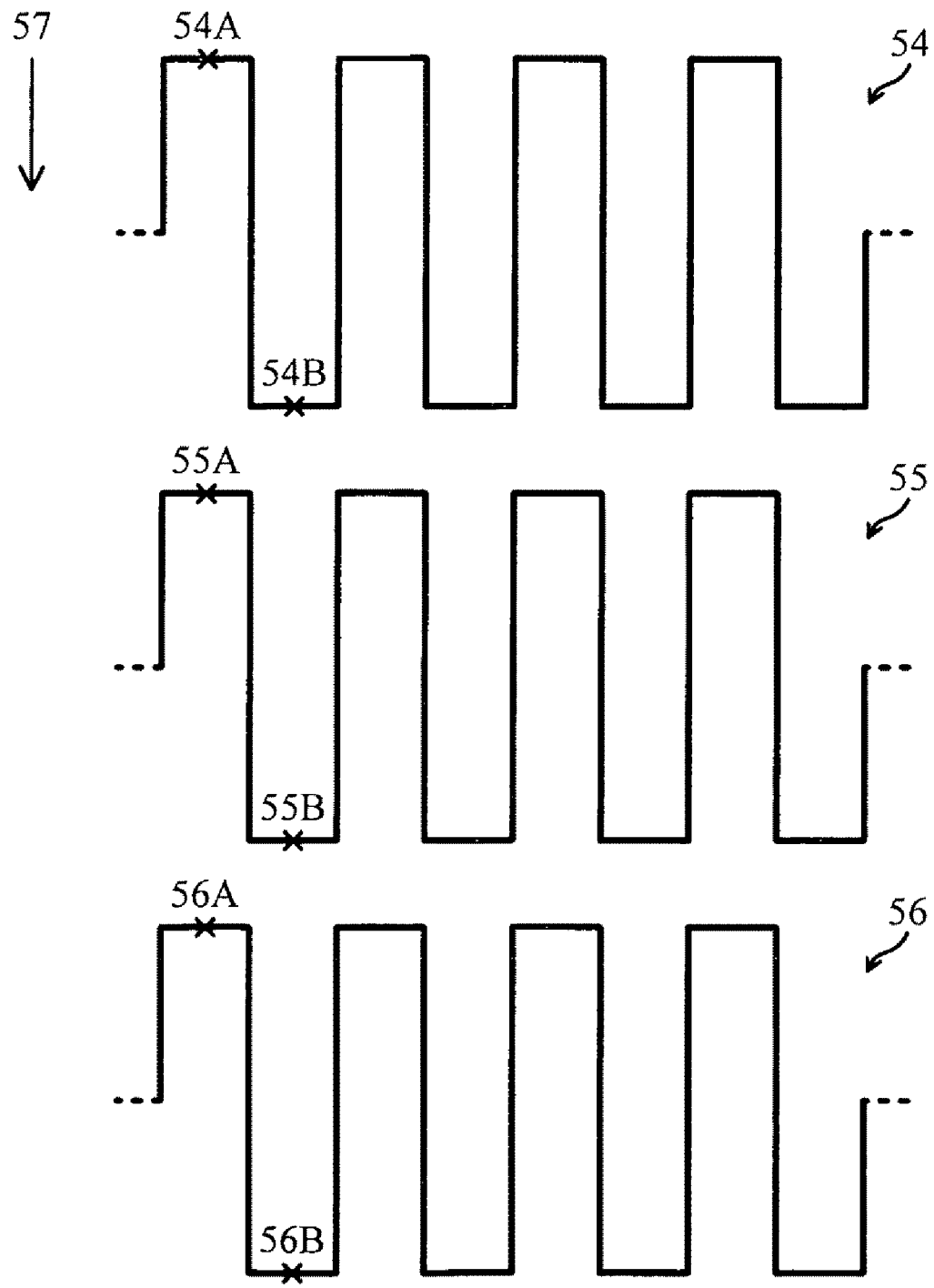
FIG. 5(D) illustrates the CVBS waveform corresponding to three adjacent horizontal lines in FIG. 5(B).

FIG. 5(D) illustrates the CVBS waveform corresponding to three adjacent horizontal lines 54~56 in FIG. 5(B). As shown in FIG. 5(D), the voltages of the sample points 54A, 55A, and 56A are the same. The voltages of the sample points 54B, 55B, and 56B are also the same. Accordingly, along the vertical direction (i.e. direction of the arrow 57), the changing frequency of the CVBS waveform corresponding to lines 54~56 is considerably low. With this property, methods according to the invention can determine whether an image includes vertical and interlaced bright/dark lines shown in FIG. 5(B).

According to the invention, every horizontal line respectively corresponds to one horizontal filtering result. In the sub-step S42B, a second band-pass filtering procedure is performed on the plural horizontal filtering results to generate a band-pass filtering result. In the sub-step S42C, a notch filtering procedure is performed on the plural horizontal filtering results to generate a notch filtering result.

The function of the second band-pass filtering procedure and the notch filtering procedure can be viewed as judging whether the plural horizontal filtering results have high frequency components in the vertical direction. Please refer to FIG. 5(E). The curve 58A represents the filtering mode of the second band-pass filtering procedure. The curve 58B represents the filtering mode of the notch filtering procedure.

In the sub-step S42D, it is judged whether the band-pass filtering result is smaller than the notch filtering result. If the band-pass filtering result is smaller than the notch filtering result, it means that there are more low frequency components than high frequency components in the vertical direction of the target block. Therefore, in the sub-step S42E, a judging result indicating that the target block includes vertical non-chroma lines is generated. On the contrary, if the band-pass filtering result is larger than the notch filtering result, in the sub-step S42F, an opposite judging result indicating that the target block does not include vertical non-chroma lines is generated.

Figure 5E:
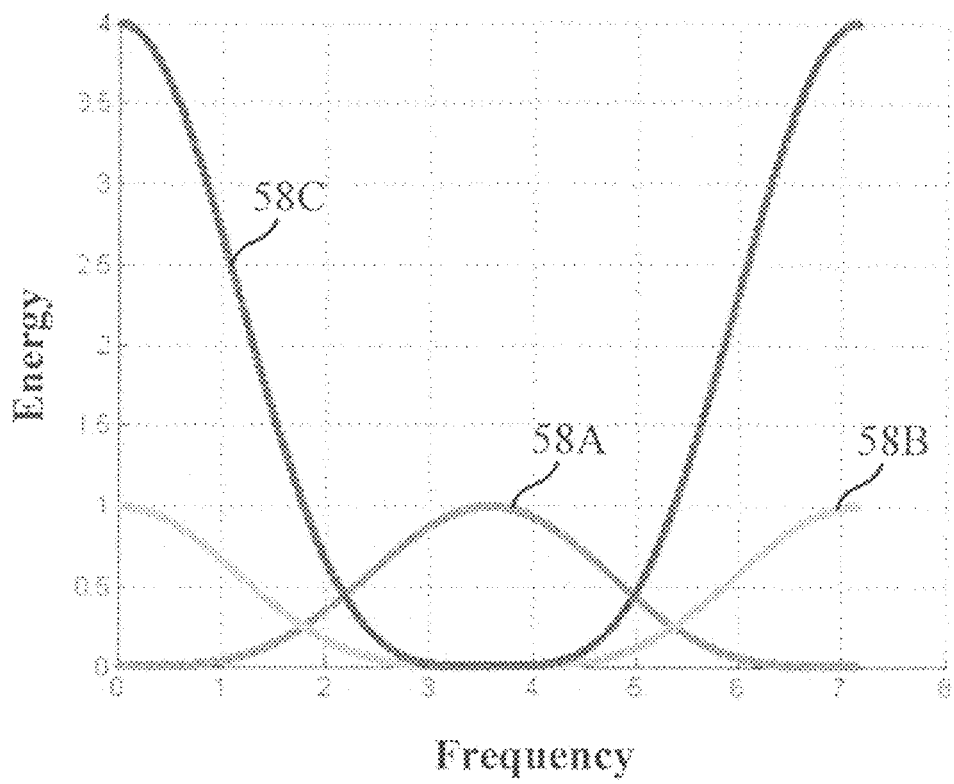
FIG. 5(E) illustrates the filtering mode of the second bandpass filtering procedure and the notch filtering procedure.

In the notch filtering procedure, according to the invention, the notch filtering result can be the product of an initial notch filtering result and an adjustable gain. Changing the adjustable gain is equivalent to adjusting the filter parameters in the notch filtering procedure. The curve 58C in FIG. 5(E) represents the filtering mode of the notch filtering procedure after multiplying the adjustable gain. Thereby, the methods and apparatuses according to the invention can control the notch filtering result without drastically amending components in the filter. In general, adjusting the gain can determine the frequency threshold for judging the existence of vertical non-chroma components. Signals under the frequency threshold are viewed as vertical non-chroma components.

On the other hand, step S42 can utilize the sub-steps shown in FIG. 6(B) to judge whether the target block includes a horizontal non-chroma line. First, in the sub-step S42G, a first band-pass filtering procedure is performed on the plural vertical lines in the target block to generate plural vertical filtering results.

Figure 5F:
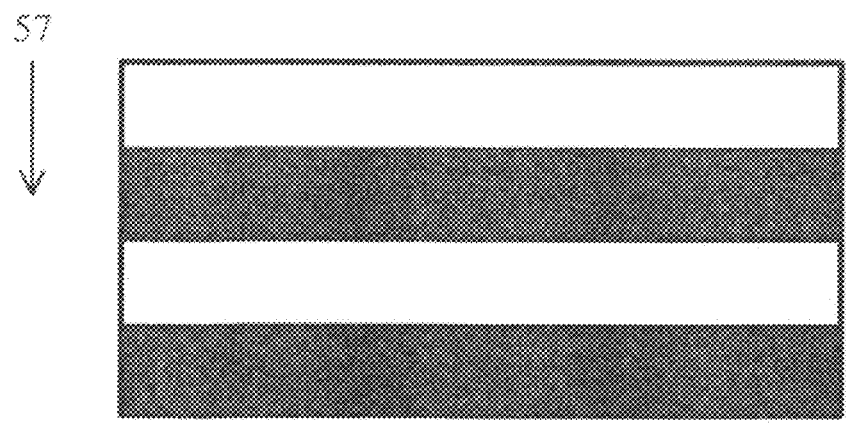
FIG. 5(F) shows an example of horizontal and interlaced bright/dark lines.

An image may have a portion composed of horizontal and interlaced bright/dark lines (i.e. plural horizontal non-chroma lines) as shown in FIG. 5(F). In this condition, there are high frequency components in the vertical direction but not in the horizontal direction. As described above, the voltage of the stair-like signal in a CVBS corresponds to the brightness of images. The brighter horizontal lines shown in FIG. 5(F) correspond to a higher voltage. The darker horizontal lines shown in FIG. 5(F) correspond to a lower voltage.

Accordingly, along the vertical direction (i.e. direction of the arrow 57), the horizontal lines in FIG. 5(F) correspond to interlaced high/low voltages. In other words, along the vertical direction, the changing frequency of the CVBS waveform corresponding to horizontal and interlaced bright/dark lines is considerably high. With this property, methods according to the invention can determine whether an image includes horizontal and interlaced bright/dark lines shown in FIG. 5(F).

After the sub-step S42G, the plural vertical filtering results can be further analyzed. In the sub-step S42H, a second band-pass filtering procedure is performed on the plural vertical filtering results to generate a band-pass filtering result. In the sub-step S42I, a notch filtering procedure is performed on the plural vertical filtering results to generate a notch filtering result. In the sub-step S42J, the band-pass filtering result and the notch filtering result are compared. If the band-pass filtering result is smaller than the notch filtering result, in the sub-step S42K, a judging result indicating that the target block includes horizontal non-chroma lines is generated. On the contrary, if the band-pass filtering result is larger than the notch filtering result, in the sub-step S42L, an opposite judging result indicating that the target block does not include horizontal non-chroma lines is generated. Similarly, the notch filtering result can also be the product of an initial notch filtering result and an adjustable gain.

The second embodiment according to the invention is an image processing apparatus. Please refer to FIG. 7(A), which illustrates the block diagram of this apparatus. The image processing apparatus 600 includes a receiving module 61, a judging module 62, and an edge detecting module 63. The receiving module 61 is used for receiving an image signal. The judging module 62 is coupled to the receiving module 61 and is used for judging whether a target block in the image signal includes a non-chroma line. The edge detecting module 63 is coupled to the judging module 62. If the judging result of the judging module 62 is YES, the edge detecting module 63 performs a first edge detecting procedure on the non-chroma line. If the judging result of the judging module 62 is NO, the edge detecting module 63 performs a second edge detecting procedure on the target block.

In practical applications, as shown in FIG. 7(B), the image processing apparatus 600 can further include a luma/chroma separating module 64 and a sharpening module 65. The luma/chroma separating module 64 is coupled to the edge detecting module 63. Based on a detecting result of the first edge detecting procedure or the second edge detecting procedure, the luma/chroma separating module 64 performs a luma/chroma separating procedure on the target block. The sharpening module 65 is also coupled to the edge detecting module 63. Based on the aforementioned detecting result, the sharpening module 65 performs a sharpening procedure on the target block.

Besides, as shown in FIG. 7(C), the judging module 62 can include a plurality of functional units. The first band-pass filtering unit 62A, the second band-pass filtering unit 62B, the first notch filtering unit 62C, and the first comparing unit 62D are mainly used for judging whether the target block includes a vertical non-chroma line. The third band-pass filtering unit 62E, the fourth band-pass filtering unit 62F, the second notch filtering unit 62G, and the second comparing unit 62H are mainly used for judging whether the target block includes a horizontal non-chroma line.

The first band-pass filtering unit 62A performs a horizontal filtering procedure on each of plural horizontal lines in the target block to generate plural horizontal filtering results. The second band-pass filtering unit 62B performs a band-pass filtering procedure on the plural horizontal filtering results to generate a band-pass filtering result (M1). The first notch filtering unit 62C performs a notch filtering procedure on the plural horizontal filtering results to generate a notch filtering result (N1). The first comparing unit 62D is used for comparing the band-pass filtering result (M1) and the notch filtering result (N1). If the band-pass filtering result (M1) is smaller than the notch filtering result (N1), the first comparing unit 62D generates a judging result indicating that the target block includes vertical non-chroma lines.

The third band-pass filtering unit 62E performs a vertical filtering procedure on each of the plural vertical lines in the target block to generate plural vertical filtering results. The fourth band-pass filtering unit 62F performs a band-pass filtering procedure on the plural vertical filtering results to generate a band-pass filtering result (M2). The second notch filtering unit 62G performs a notch filtering procedure on the plural vertical filtering results to generate a notch filtering result (N2). The second comparing unit 62H is used for comparing the band-pass filtering result (M2) and the notch filtering result (N2). If the band-pass filtering result (M2) is smaller than the notch filtering result (N2), the second comparing unit 62H generates a judging result indicating that the target block includes horizontal non-chroma lines.

The third embodiment according to the invention is another image processing method. Please refer to FIG. 8, which illustrates the flowchart of this method. The main difference between this embodiment and the first embodiment is, in this embodiment, when judging whether a target block includes a non-chroma line, a first edge detecting procedure and a second edge detecting procedure are performed on the target block at the same time. Thereby, the time of waiting for the judging result can be saved.

Different from the first embodiment, in the first and second edge detecting procedures in this embodiment, only the voltage difference between two sample points (e.g. the first and second voltage differences) are calculated. The voltage differences are not compared with a threshold value.

As described above, the resolution of the first edge detecting procedure is higher than that of the second edge detecting procedure. For example, in the first edge detecting procedure, the sampling time difference between two sample points to be compared is smaller than the period of the chroma signal. On the contrary, in the second edge detecting procedure, the sampling time difference between two sample points to be compared can be equal to the period of the chroma signal.

In step S81, an image signal is first received. Then, in step S82, a judging procedure to judge whether a target block in the image signal includes a non-chroma line is performed, and a weighting value is generated based on the judging result of the judging procedure.

In step S83, a first edge detecting procedure is performed on the target block, and a first voltage difference is thereby generated. In step S84, a second edge detecting procedure is performed on the target block, and a second voltage difference is thereby generated. In practical applications, steps S82~S84 can be performed at the same time instead of sequentially. Then, based on the weighting value, the first voltage difference, and the second voltage difference, a weighted voltage difference is calculated.

For example, if a line is judged as a non-chroma line in step S82, a weighting value enhancing the first voltage difference can be generated in step S82. On the contrary, if a line is judged as a chroma line in step S82, another weighting value enhancing the second voltage difference can be generated in step S82.

In step S86, it is judged whether the weighted voltage difference is larger than a threshold value. If the weighted voltage difference is larger than the threshold value, step S87 is performed to generate a detecting result indicating an edge exists in the target block. On the contrary, if the weighted voltage difference is smaller than the threshold value, step S88 is performed to generate another detecting result indicating no edge exists in the target block.

Similar to the first embodiment mentioned above, the method in this embodiment can also further include a luma/chroma separating procedure and a sharpening procedure.

The fourth embodiment according to the invention is another image processing apparatus. Please refer to FIG. 9, which illustrates the block diagram of this apparatus. The image processing apparatus 900 includes a receiving module 91, a judging module 92, a first edge detecting module 93, a second edge detecting module 94, a calculating module 95, and a comparing module 96.

The receiving module 91 is used for receiving an image signal. The judging module 92 performs a judging procedure to judge whether a target block in the image signal includes a non-chroma line, and it then generates a weighting value based on a judging result of the judging procedure. The first edge detecting module 93 performs a first edge detecting procedure on the target block to generate a first voltage difference. The second edge detecting module 94 performs a second edge detecting procedure on the target block to generate a second voltage difference.

Based on the weighting value, the first voltage difference, and the second voltage difference, the calculating module 95 calculates a weighted voltage difference. The comparing module 96 is used for comparing the weighted voltage difference with a threshold value. If the weighted voltage difference is larger than the threshold value, the comparing module 96 generates a detecting result indicating an edge exists in the target block.

As described above, because the characteristics of non-chroma and chroma lines in CVBS are different, the methods and apparatuses according to the invention can perform different edge detecting procedures on the two kinds of lines. Thereby, compared with prior arts, the methods and apparatuses according to the invention can reduce the possibility of missing edges of colors and/or brightness. The image quality can accordingly be improved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing method for processing an image signal, comprising the steps of:
   (a) receiving the image signal;
   (b) judging whether a target block in the image signal comprises a non-chroma line; and
   (c) if the judging result of step (b) is YES, performing a first edge detecting procedure on the non-chroma line and selectively performing a second edge detecting procedure on the target block except the non-chroma line; if the judging result of step (b) is NO, performing the second edge detecting procedure on the target block.

2. The method of claim 1, wherein step (b) comprises:
   performing a first band-pass filtering procedure on each of plural horizontal lines in the target block to generate plural horizontal filtering results;
   performing a second band-pass filtering procedure on the plural horizontal filtering results to generate a band-pass filtering result;
   performing a notch filtering procedure on the plural horizontal filtering results to generate a notch filtering result; and
   comparing the band-pass filtering result and the notch filtering result; if the band-pass filtering result is smaller than the notch filtering result, generating a judging result that indicates the target block comprises a vertical non-chroma line.

3. The method of claim 2, wherein in the notch filtering procedure, an initial notch filtering result is multiplied by an adjustable gain to generate the notch filtering result.

4. The method of claim 1, wherein step (b) comprises:
   performing a first band-pass filtering procedure on each of plural vertical lines in the target block to generate plural vertical filtering results;
   performing a second band-pass filtering procedure on the plural vertical filtering results to generate a band-pass filtering result;
   performing a notch filtering procedure on the plural vertical filtering results to generate a notch filtering result; and
   comparing the band-pass filtering result and the notch filtering result; if the band-pass filtering result is smaller than the notch filtering result, generating a judging result that indicates the target block comprises a horizontal non-chroma line.

5. The method of claim 4, wherein in the notch filtering procedure, an initial notch filtering result is multiplied by an adjustable gain to generate the notch filtering result.

6. The method of claim 1, wherein the non-chroma line comprises a first sample point and a second sample point, and the first edge detecting procedure comprises:
   calculating a voltage difference between the first sample point and the second sample point; and
   comparing the voltage difference with a threshold value, and if the voltage difference is larger than the threshold value, generating a detecting result that indicates an edge exists in the non-chroma line;
   wherein the image signal is capable of comprising a chroma signal, the chroma signal is generated by modulating a carrier signal that has a default period, and a sampling time difference between the first sample point and the second sample point is smaller than the default period.

7. The method of claim 1, wherein a target line in the target block comprises a first sample point and a second sample point, and the second edge detecting procedure comprises:
   calculating a voltage difference between the first sample point and the second sample point; and
   comparing the voltage difference with a threshold value, and if the voltage difference is larger than the threshold value, generating a detecting result that indicates an edge exists in the target line;
   wherein the image signal is capable of comprising a chroma signal, the chroma signal is generated by modulating a carrier signal that has a default period, and a sampling time difference between the first sample point and the second sample point is substantially equal to the default period.

* * * * *